NILE F. HARTMAN
INVENTOR

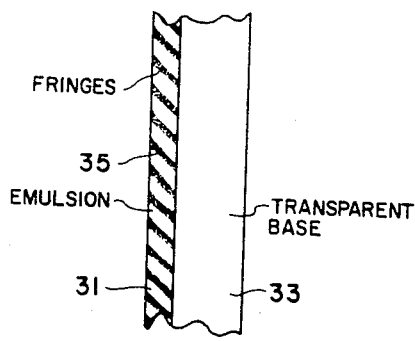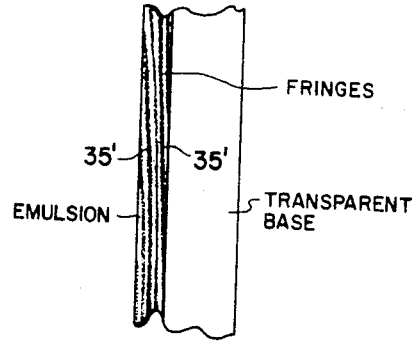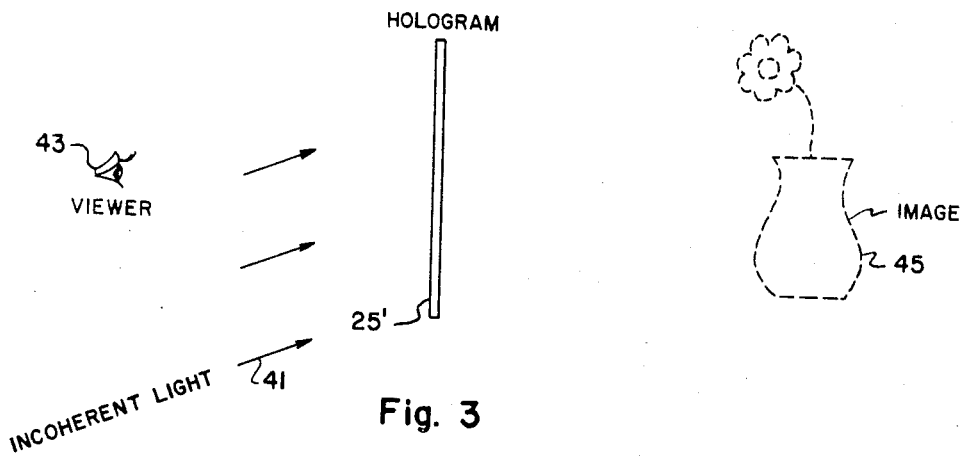

United States Patent Office 3,532,406
Patented Oct. 6, 1970

3,532,406
WAVEFRONT RECONSTRUCTION WITH INCOHERENT LIGHT
Nile F. Hartman, Columbus, Ohio, assignor to The Battelle Development Corporation, Columbus, Ohio, a corporation of Delaware
Filed Mar. 30, 1966, Ser. No. 538,854
Int. Cl. G02b 27/22
U.S. Cl. 350—3.5
7 Claims

ABSTRACT OF THE DISCLOSURE

A method for producing and reconstructing images from a hologram wherein the pattern of interference fringes is formed on a photographic plate by an object-bearing beam and a reference beam impinging on opposite sides of the plate, and reconstructing the image by illuminating the hologram in reflection with incoherent light.

This invention relates to the reconstruction of an image from a pattern of interference fringes formed by at least two beams of coherent light one of the beams being modified by passing through or being reflected from an object. More particularly, it concerns the formation of the pattern of interference fringes and reconstructing images therefrom using incoherent, i.e. polychromatic light for the reconstruction.

The production of a specialized pattern of interference fringes that reconstructs a three-dimensional image is customarily accomplished by a first beam of coherent light carrying Fresnel zone plate patterns for each point on an object interfering with a second beam of coherent light. The interference pattern is recorded and a three-dimensional image may be reconstructed by directing coherent light onto the interference pattern, which, by diffraction, reconstructs the wavefronts of light in a configuration that, for all practical purposes, is identical to those that emanated from the object used to modify the first beam. The first beam may be referred to as the object-bearing beam and the second beam is usually referred to as the reference beam. This method is described in more detail in copending U.S. patent application S.N. 503,993, filed Oct. 23, 1965, and its parent copending application, S.N. 361,977, filed Apr. 23, 1964.

One disadvantage of the above-described method is that a source of coherent light or at least a reasonably monochromatic source, is required for reconstructing the three-dimensional images. A filtered arc-type lamp traversing a pin hole is a relatively weak source of coherent light so that the most obvious source of coherent light is a laser. This, to a certain extent, limits the reconstruction step to a laboratory function since the environment must be limited to one of coherent light (a darkened room) and the cost of a suitable laser is quite high to allow the average person to view the images as commonly as home movies or photographs.

It is accordingly an object of this invention to eliminate the use of coherent light as a source of light for reconstructing images from the interference pattern commonly referred to as a hologram.

The previous method of producing a hologram was to illuminate the object with coherent radiation and position a photographic plate to receive the light emanating from the object. A reference beam of coherent light was directed to interfere with the light from the object so that the emulsion side of the photographic plate recorded the interference pattern. Both the object-bearing beam and reference beam impinged on the same side of the photographic plate.

Briefly described, this invention includes a method for producing and reconstructing three-dimensional images from a hologram comprising forming a pattern of interference fringes on a photographic plate wherein the object-bearing beam and reference beam impinge on opposite sides of a photographic plate and reconstructing the image by illuminating the hologram with incoherent light and viewing the reflected image.

The source may be the light of an incandescent lamp or other polychromatic noncoherent source. This back-beam hologram behaves as a selective reflecting filter, reconstructing the image in a narrow band of wavelengths which appear as a single color. The particular spectral band which is visible in the reconstruction depends markedly on the geometry of construction. The reconstruction color tends to shift to a shorter wavelength, because of shrinkage of the emulsion which changes the spacing of the interference fringe pattern. However, it is possible to control the amount of spectral shift by adjustment of the chemical processing variables during development. Also, since it is obvious, from the copending application, that multiple images and images using radiation of more than one wavelength can be stored in the hologram, it is possible to reconstruct multicolor images from back-beam holograms viewed by reflection in white light, each color being selectively reflected from the hologram and combined in the image to yield a colored image.

One advantage of this invention is that a back-beam hologram is formed that is as convenient for viewing at almost all other types of recorded images with the additional feature of being truly three-dimensional.

Still another advantage of this invention is that an art heretofore largely confined to the laboratory is made available to general use.

Still other objects and advantages of this invention will be apparent from the description that follows, the drawings and the claims.

In the drawings:

FIG. 2a is an enlarged cross section of a photographic plate showing an example of the arrangement of fringes in the emulsion of a front beam hologram;

FIG. 2b is an enlarged cross section of a photographic plate showing an example of the arrangement of fringes in the emulsion of a back beam hologram; and FIG. 3 is a diagram showing the reconstruction of an image from a back-beam hologram.

Figure 1:
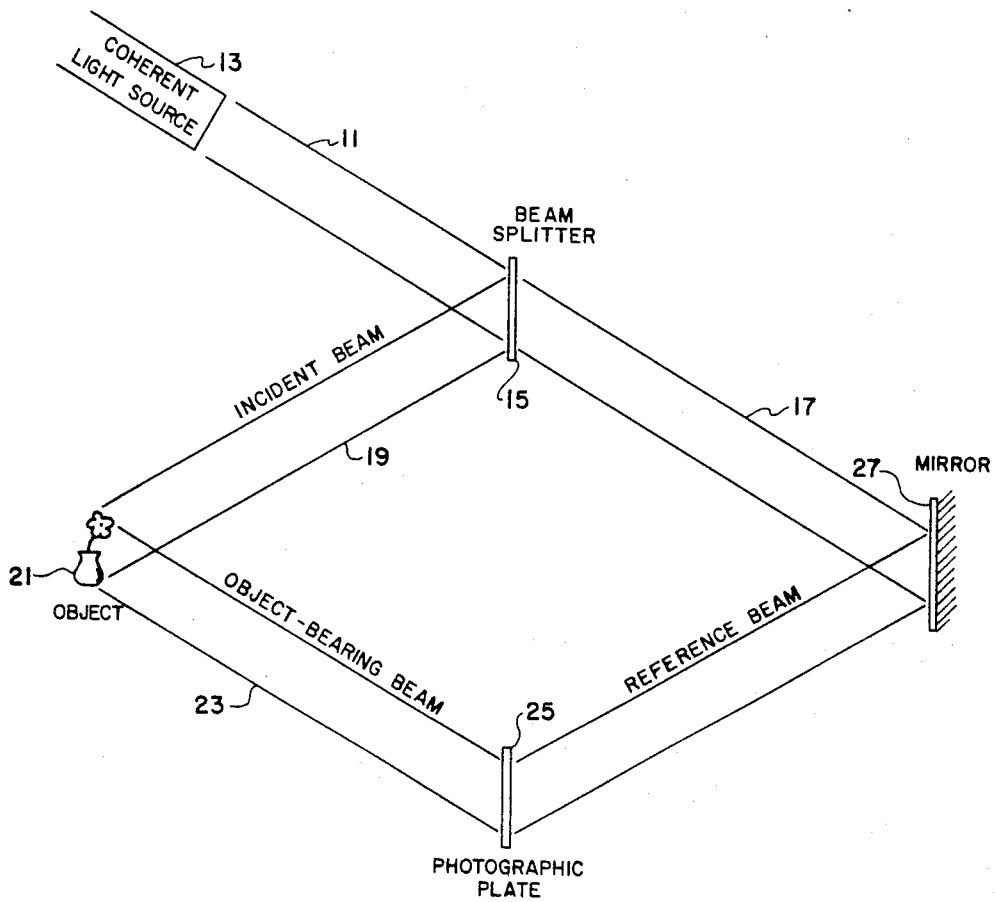
FIG. 1 is a diagram showing the production of a back-beam hologram.

Referring to FIG. 1, the beam 11, from a source of coherent light 13 is diviedd, by suitable means, such as a beam splitter 15, into a reference beam 17 and an incident beam 19. The incident beam 19 illuminates an object 21. The reflected light or object-bearing beam 23 from the object 21 passes to a photographic plate 25. The reference beam 17 is directed onto the photographic plate 25 by suitable means such as a mirror 27, but strikes the plate 25 on the side opposite that illuminated by the object-bearing beam 23. An interference pattern is produced and recorded by the photographic plate 25. Preferably the path lengths of the incident and object-bearing beams (19 and 23) are about equal to the total path length of the reference beam 17, although if the light is absolutely coherent this is unnecessary. Usually so-called coherent sources of light are coherent only over a certain distance.

The arrangement for bringing the two beams (object-bearing and reference) into opposite sides of the recording device may of course be varied considerably. Two separate sources of coherent light may be even used as long as they are "locked in phase"; and, of course, the optical devices used for directing the various beams may be selected for convenience.

FIGS. 2a and 2b are a comparison of example fringe patterns produced in the emulsions of two photographic plates. FIG. 2a is an example of a front-beam hologram and FIG. 2b is an example of a back-beam hologram. These holograms were produced and then sectioned to determine the difference in the fringe patterns of the two methods. It is known that the interference pattern is produced by maxima and minima of the wave forms in the two light beams as they cross. In FIG. 2a the emulsion 31 is positioned on a transparent base 33 (such as glass). After exposure with the front beam technique the developed plate, was sectioned, and examined under a microscope. The dark silver grains or fringes 35 in the emulsion 31 indicate points of interference maxima between the object bearing beam and reference beam, i.e., the antinodes of the standing waves. These fringes 35—35 are slanted about 30 to 40 degrees from the horizontal, and depend largely on the angle between the two beams and the angle at which they strike the plane of the photographic plate. The angle is substantially parallel to a line that bisects the angle between the object-bearing beam and reference beam. The maximum angle permitted by the front-beam technique is limited by the refractive index of the emulsion 31 and consequently by the critical angle for total internal reflection, which for silver halide emulsions is about 40 degrees. In FIG. 2b, wherein a photographic plate was used to record a back-beam hologram, the franges 35'—35' are vertical or near vertical also being substantially parallel to a line that bisects the angle formed between the object-bearing beam 23 and reference beam 17. These two holograms of FIGS. 2a and 2b may both be called specialized diffraction gratings, but it is obvious that their diffraction characteristics will be quite different. Thus, the back-beam hologram can be reconstructed in reflected incoherent light, a property not shared by the front-beam hologram.

FIG. 3 shows the reconstruction of an image from a back-beam hologram 25'. The hologram 25' is illuminated by reflection of incoherent light 41 (daylight or an incandescent light) and the viewer 43, although viewing a reflected image still sees the three-dimensional image 45 of the object 21 through the "hologram window," i.e., as if it were behind the hologram 25'. If the emulsion did not shrink during processing of the plate, this image has the color of the light that was used to form the hologram.

Actually, because of some shrinkage of the emulsion, the color (that the hologram "selects") is shifted toward the blue, toward the yellow or even green, but is still distinctly a selective phenomenon. The hologram 25' reconstructs the wavefront forms substantially identical to those that emanated from the object 21 and "filters out" the remaining light.

There are possible ways to eliminate the color shift. For example, one may employ another photosensitive material or process in which shrinkage does not occur, or the shrinkage can be compensated for by constructing the hologram using a suitable longer wavelength of radiation. It may also be possible to reproduce a second hologram from the original hologram with a strict control of the fringe spacing for the purpose of correction of wavelength. It is obvious that multiple-wavelength recordings in the hologram can also be corrected by one of the above techniques so that colored images may be reconstructed.

Three-dimensional color images are reconstructed by mixing at least two wavelengths (say blue and red) together at the coherent light source 13. Both (or, if desired three colors) colors are used in the incident beam 19 to illuminate the object and both colors are used in the reference beam 17. When the hologram 25' is reconstructed with incoherent light (as shown in FIG. 3) the image 45 appears in color as if the hologram 25 were formed with white light illuminating the object because the back-beam hologram 25' now reflects all the wavelengths of light.

It will be understood, of course, that while the forms of the invention shown and described herein constitute preferred embodiments of the invention, it is not intended to illustrate all of the possible equivalent forms of ramifications of the invention. It will also be understood that the words are words of description rather than of limitation, and that various changes may be substituted without departing from the spirit or scope of the invention herein described.

What is claimed is:

1. A method of producing images of an object comprising:
   (a) illuminating an object with a first beam of coherent light to produce an object-bearing beam,
   (b) positioning a photographic plate to receive on one side thereof the object-bearing beam,
   (c) directing a second beam of light, simultaneously and coherent with said first beam of coherent light as a reference beam onto the side of said photographic plate opposite said one side receiving the object-bearing beam, said object-bearing beam and said reference beam being angularly displaced with respect to each other at a finite angle to produce an interference pattern in the form of a back-beam hologram on said photographic plate.
   (d) developing said photographic plate, and
   (e) reconstructing an image of said object by illuminating said developed photographic plate in reflection with incoherent light.

2. A method of producing images of an object comprising:
   (a) illuminating an object with a first beam of coherent light to produce an object-bearing beam.
   (b) positioning a photographic plate to receive on one side thereof the object-bearing beam,
   (c) directing a second beam of light, simultaneously and coherent with said first beam of coherent light as a reference beam onto the side of said photographic plate opposite said one side receiving the object-bearing beam, said object-bearing beam and said reference beam being angularly displaced with respect to each other at a finite angle to produce an interference pattern in the form of a back-beam hologram on said photographic plate,
   (d) developing said photographic plate to provide said photographic plate with selective reflective filtration characteristics, and
   (e) reconstructing an image of said object by illuminating said developed photographic plate in reflection with white light, said image being of a particular color, said color being determined by the selective reflective filtration characteristics of said developed photographic plate.

3. A method of producing images in accordance with claim 2 including adjusting the angles at which the object-bearing beam and the reference beam impinge upon the photographic plate to control the selective reflective filtration characteristics of said developed plate for determining the color of said image.

4. A method of producing images in accordance with claim 2 including adjusting the angle at which the white light impinges upon said developed photographic plate for reconstructing the image to control the color of said image.

5. A method of producing images in accordance with claim 2 including varying the emulsion thickness of said photographic plate during development processing to control the selective reflection filtration characteristics of said developed plate for determining the color of said image.

6. A method of producing multi-color images of an object comprising:
   (a) illuminating an object with a first beam containing at least two colors of coherent light to produce an object-bearing beam, (b) positioning a photographic plate to receive on one side thereof the object-bearing beam, (c) directing a second beam of light of said at least two colors, simultaneously and coherent with said first beam of coherent light as a reference beam, onto the side of said photographic plate opposite said one side receiving the object-bearing beam, said object-bearing beam and said reference beam being angularly displaced with respect to each other at a finite angle to produce an interference pattern in the form of a back-beam hologram on said photographic plate, (d) developing said photographic plate, and (e) reconstructing a multi-color image of said object by illuminating said back-beam hologram in reflection with incoherent light.

7. The method of producing an image of an object from a back-beam hologram produced from a pattern of interference fringes resulting from the combination of an object-bearing beam of coherent light and a reference beam coherent therewith respectively directed simultaneously onto opposite sides of a hologram recording medium and angularly displaced with respect to each other at a finite angle comprising the step of:

reconstructing an image of the object by illuminating the back-beam hologram in reflection with incoherent light.

References Cited

UNITED STATES PATENTS 3,107,170  10/1963  Netke _____ 350—3.5

OTHER REFERENCES

Denisyuk, Optics & Spectroscopy, vol. 15, No. 4, October 1963, pp. 279–284.

Pennington et al., Applied Physics Letters, vol. 7, No. 3, August 1965, pp. 56–57.

Pennington Microwaves, October 1965, pp. 35–40.

Stroke et al., Physics Letters, vol. 20, No. 4, Mar. 1, 1966, pp. 368–370.

DAVID SCHONBERG, Primary Examiner

R. J. STERN, Assistant Examiner